United States Patent [19]

Evans et al.

[11] Patent Number: 4,533,566
[45] Date of Patent: Aug. 6, 1985

[54] ELECTRON-BEAM ADHESION-PROMOTING TREATMENT OF POLYESTER FILM BASE FOR SILICONE RELEASE LINERS

[75] Inventors: Jack L. Evans, St. Paul; Karen J. Campbell, White Bear Township, Ramsey County; Curtis L. Kreil, Woodbury; LuAnn Sidney, White Bear Township, Ramsey County, all of Minn.

[73] Assignee: Minnesota Mining and Manufacturing Company, St. Paul, Minn.

[21] Appl. No.: 628,153

[22] Filed: Jul. 5, 1984

[51] Int. Cl.³ .............................................. B05D 3/06
[52] U.S. Cl. ........................................ 427/44; 427/35; 427/322
[58] Field of Search ............ 427/35, 44, 208.4, 208.8, 427/322; 204/159.19

[56] References Cited

U.S. PATENT DOCUMENTS

| | | | |
|---|---|---|---|
| 2,863,812 | 12/1958 | Graham | 204/159.19 |
| 2,940,869 | 6/1960 | Graham | 204/159.19 |
| 2,955,953 | 10/1960 | Graham | 117/47 |
| 2,997,419 | 8/1961 | Lawton | 204/159.19 |
| 3,188,229 | 6/1965 | Graham | 204/159.19 |
| 3,188,266 | 6/1965 | Charbonneau et al. | 161/188 |
| 3,284,331 | 11/1966 | McBride et al. | 204/165 |
| 3,628,987 | 12/1971 | Nakata et al. | 427/208.8 |
| 3,715,334 | 2/1973 | Karstedt | 260/46.5 |
| 3,783,004 | 1/1974 | Parker | 204/159.19 |
| 4,128,426 | 12/1978 | Ohta et al. | 96/87 |
| 4,140,607 | 2/1979 | Kreiselmeier et al. | 204/168 |
| 4,210,703 | 7/1980 | Scantlin et al. | 428/130 |
| 4,267,202 | 5/1981 | Nakayama et al. | 427/40 |
| 4,386,135 | 5/1983 | Campbell et al. | 428/447 |

FOREIGN PATENT DOCUMENTS

| | | |
|---|---|---|
| 57-84115 | 5/1982 | Japan . |
| 58-141214 | 8/1983 | Japan . |

OTHER PUBLICATIONS

Briggs, D., et al., "Surface Modification of Poly(ethylene terephthalate) by Electrical Discharge Treatment", *Polymer*, Aug. 1980, pp. 895-900.

Rand, W. M., Jr., "Electron Curing of Magnetic Coatings", *Radiation Curing*, Feb., 1983, pp. 26-31.

Th.Goldschmidt, AG Trade Literature.

*Primary Examiner*—Richard Bueker
*Attorney, Agent, or Firm*—D. M. Sell; J. A. Smith; D. B. Little

[57] ABSTRACT

A silicone coating of a silicone release liner which has a polyester film base is better adhered to the film base and better resists removal when rubbed if the film base is first subjected to electron-beam irradiation while passing through an inert atmosphere such as nitrogen.

13 Claims, 2 Drawing Figures

ELECTRON-BEAM ADHESION-PROMOTING TREATMENT OF POLYESTER FILM BASE FOR SILICONE RELEASE LINERS

FIELD OF THE INVENTION

The invention concerns a silicone release liner having a flexible polyester film base, and particularly concerns an adhesion-promoting treatment to enhance the adhesion of a silicone coating to a polyester film base. By "polyester film base" is meant (1) biaxially-oriented poly(ethylene terephthalate) film obtained from ethylene glycol and dimethyl terephthalate or terephthalic acid and (2) biaxially-oriented films of related polyesters.

CROSS-REFERENCES TO RELATED APPLICATIONS

This application is closely related to two applications of even filing date, one entitled "Electron-beam Adhesion-Promoting Treatment of Polyester Film Base" (Ser. No. 627,812) and the other entitled "Electron-Beam Adhesion-Promoting Treatment of Polyester-Film Base for Magnetic Recording Media" (Ser. No. 628,154).

BACKGROUND ART

Pressure-sensitive adhesive tapes often include release liners which are stripped off when the tapes are put to use. Widely used in release liners is biaxially-oriented poly(ethylene terephthalate) film base, being readily available, strong, smooth, dimensionally stable, and having good resistance to elevated temperatures. Preferred release materials include silicone coatings which adhere well to polyester film base immediately after being cured, but their adhesion becomes poor within a week or two. This poor adhesion is especially apparent when employed in release liners which are to be reused.

Solvent-free addition-cure silicones comprise a preferred class for release liners because (1) they avoid pollution or solvent-recovery problems and (2) they tend to release more easily from agressive pressure-sensitive adhesive layers than do other silicones. However, after a week or two they tend to adhere more poorly to polyester film base than do other silicones and hence are seldom used, in spite of the availability of a variety of known adhesion-promoting treatments for polyester film base. Such treatments include corona discharge, spark and other electrical discharges, flame, and physical and/or chemical etching. Other techniques for promoting adhesion to polyester film base employ organic priming or subbing coatings which can be better adhered to the film base by subjecting the coatings to ultraviolet radiation as taught in U.S. Pat. Nos. 3,188,266 (Charbonneau et al.) and 4,210,703 (Scantlin et al.).

U.S. Pat. No. 2,955,953 (Graham) concerns promoting adhesion to any solid organic polymeric substrate by subjecting it in the substantial absence of oxygen to charged particle ionizing radiation having an energy of from 15 to 50,000 electron volts. The accelerated particles may be utilized in a vacuum or may pass through a window and utilized in air or a gas. In the Example, cellophane was irradiated in a cathode ray tube, and only the face of the film exposed to the electron beam exhibited the desired improvement in adhesion. The Graham patent suggests that not more than five minutes should elapse before a coating is applied unless the irradiated substrate "is kept in an inert atmosphere such as under nitrogen, argon, helium or the like and/or is stored at a low temperature such as at $-80°$ C." (column 2, lines 1-6).

Japanese Patent Application JA55-160598 (Takada et al.) which was laid open May 26, 1982 concerns the application by vacuum deposition of a magnetizable thin film such as Co/Ni to polyester film. Immediately before applying the magnetizable thin film, the polyester film base is placed in a poly(ethylene terephthalate) tube or bag and subjected to electron-beam radiation having an energy of 2.5 Mev (Examples 1 and 2). Although none of the examples give other conditions of the preirradiation, the final paragraph of the application states that the preirradiation may be conducted in a vacuum container, followed immediately be deposition of the magnetizable thin film to keep the surface of the film base free from moisture and dust. By doing so, the Co/Ni or other magnetizable film is said to adhere better to the polyester film base. See also the claim and the penultimate paragraph immediately preceding Example 1.

In efforts to develop a silicone release liner having a polyester film base, it has been difficult to quantify the effectiveness of adhesion-promoting treatments in silicone-coated release liners. In one test an aggressively pressure-sensitive silicone adhesive tape is pressed against the silicone coating of the release liner, thus creating a bond between the tape and the silicone coating which is stronger than the bond between the silicone coating and the polyester film base. The force required to peel back the tape is recorded as a measure of how well the silicone coating is adhered to the polyester film base. Although peel adhesion is meaningful, it may not precisely indicate the resistance of a silicone coating to be removed when rubbed. A better indication of adequate adhesion to resist rubbing or abrasion failure has been obtained by vigorously rubbing the silicone coating with one's thumb. Any adhesion test is more meaningful if the silicone coating has been cured more than a week or two prior to the test.

OTHER PRIOR ART

Some silicones which can be used for release liners can be cured by electron-beam irradiation. Among such silicones are the RC series "TEGO" silicone acrylates sold by Th. Goldschmidt AG of Essen, West Germany. Its trade literature suggests polyester among suitable substrates. However, experiments showthat electron-beam curing of a coating of one of those silicones on a polyester film base would not enhance the adhesion of the silicone coating to the film base.

DISCLOSURE OF INVENTION

The present invention concerns the manufacture of a release liner comprising a flexible polyester film base and a thin silicone coating, and specifically concerns an adhesion-promoting treatment of that film base which is free from toxic hazards and can be applied at a cost close to that of corona discharge treatment. The invention is believed to provide for the first time a repeatedly reusable silicone release liner which has a polyester film base. The invention also is believed to provide for the first time effective adhesion to polyester film base of solvent-free addition-cure silicones. Furthermore, the invention is believed to provide the only adhesion-promoting treatment for polyester film base that can simultaneously enhance adhesion of silicone coatings to both faces of the film base even though directed toward only one of its faces.

In the manufacture of a silicone release liner, the adhesion-promoting treatment of the invention involves the steps of (1) continuously passing uncoated polyester film base through an inert atmosphere while (2) exposing the film base to irradiation by an electron beam to subject the film base to an absorbed dosage of at least 2 Mrad, and (3) applying a thin silicone coating to a face of the film base to which adhesion of the coating has been enhanced by virtue of steps (1) and (2). Steps (1) and (2) promote the adhesion of a silicone coating to at least the face of the film base that faces the electron-beam radiation. The term "uncoated" refers at least to that face of the polyester film base to which a silicone coating is to be applied. By "inert atmosphere" is meant an environment comprising flue gas, nitrogen or a gas of Group 0 of the Periodic Table and containing no more oxygen than 500 parts per million. A preferred inert atmosphere is nitrogen. Argon should be equally useful.

Tests indicate that the effectiveness of the adhesion-promoting treatment of the invention does not change during prolonged storage, so that a silicone coating may be applied to an adhesion-promoted surface either immediately or after prolonged storage in air at ordinary room temperatures, with equivalent results. Such tests have involved delays of several months.

For treating polyester film base having a thickness range from 25 to 250 micrometers, the electron beam preferably has an accelerating voltage of at least 150 keV, more preferably at least 200 keV. Thinner polyester film base may be effectively treated at lower accelerating voltages, while thicker polyester film base may require higher accelerating voltages to enhance the adhesion of silicone coatings to both of its faces.

Optimum results have been obtained at dosages between 1 and 20 Mrad. Below 1 Mrad, the novel adhesion-promoting treatment would be marginally effective. Dosages above 10 Mrad product little, if any, advantage as compared to lower dosages and also involve the hazard of possibly overheating the film base. This hazard may be reduced by irradiating the film base while in contact with a water-cooled chill roll, but when doing so, adhesion only to the noncontacting face of the film base may be enhanced.

Except when a surface of a polyester film base contacts a metal roll during the adhesion-promoting treatment of the present invention, the treatment improves the adhesion of silicone coatings to both faces of the film base except possibly at low accelerating voltages.

Tests to date indicate that the oxygen content of the inert atmosphere should be as low as possible. Excellent adhesion of a silicone coating has been realized when the oxygen level of the inert atmosphere was between 10 and 40 parts per million, and best results have been obtained at the lowest oxygen levels. At the present time it may be unduly expensive to attempt to operate at levels substantially below 5 parts per million.

For economy, the adhesion-promoting treatment of the invention preferably is carried out at approximately atmospheric pressure and at web speeds of at least 50 meters per minute. Below 30 meters per minute might be too slow to be commercially feasible.

Because poly(ethylene terephthalate) is believed to be the only presently commercial polyester film base, it has been used in all work on the invention, but equivalent polyester film base should experience the same results.

The invention has a special application in the manufacture of pressure-sensitive tapes by the process disclosed in U.S. Pat. No. 4,181,752 (Martens et al.). In that process as used in the present invention, a solvent-free polymerizable composition may be coated onto a polyester film base and subjected to ultraviolet radiation to polymerize the composition to a pressure-sensitive adhesive state. The process requires air to be excluded, and this may be done by temporarily covering the polymerizable coating with a plastic release liner. When that temporary release liner is opaque to ultraviolet radiation, the ultraviolet radiation may be transmitted through the polyester film base.

Polymerization of the composition to a pressure-sensitive adhesive state in contact with the polyester film base would tend to create a strong bond of the adhesive layer to the film base unless it has an efficient release coating such as a silicone. The adhesion-promoting treatment of the invention enables the silicone coating of a silicone release liner to form a bond to the polyester film base sufficient to keep the silicone coating from transfering to and contaminating the pressure-sensitive adhesive layer when the silicone release liner is peeled away. Because of its strength and durability, it should be possible to reuse the silicone release liner many times.

When the temporary release liner used to keep air from polymerizable coating is a polyester film, it too may be provided with a silicone coating to enable it to be peeled cleanly from the resulting pressure-sensitive adhesive layer.

Figure 1:
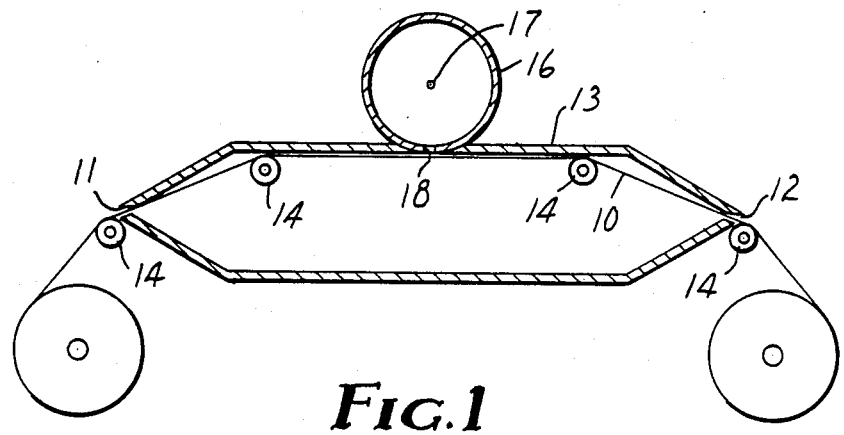
FIG. 1 schematically illustrates apparatus for applying to polyester film base the adhesion-promoting treatment of the invention.

The apparatus shown in FIG. 1 is schematically illustrated in greater detail in "Radiation Curing", February 1983, page 30. Essentially identical apparatus is schematically illustrated in "Adhesive Age", December 1982, page 28.

In FIG. 1 of the present drawing a polyester film base 10 is guided by idler rolls 14 through narrow slits 11 and 12 of a chamber 13. The slits serve as exhausts for nitrogen being pumped into the chamber. Mounted over a metallic foil window 18 of the chamber 13 is a vacuum chamber 16 containing a linear filament electron source 17. After being irradiated through the window 18, the film base 10 is wound upon itself into a roll.

Figure 2:
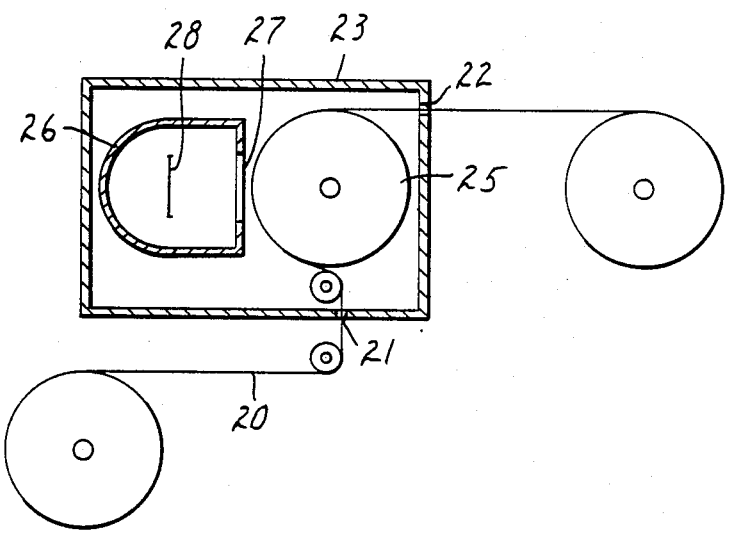
FIG. 2 schematically illustrates another apparatus for applying the adhesion-promoting treatment of the invention.

In FIG. 2, a roll of polyester film base 20 is transported through slits 21 and 22 of a chamber 23 and around a chrome-plated steel chill roll 25 mounted in the chamber. While in contact with the chill roll, the film is irradiated through a metallic foil window 27 of an electron-beam apparatus 26 which contains a series of small parallel filaments, one 28 of which is shown.

Used in each of Examples 1-10 are solvent-free addition-cure silicones.

EXAMPLES 1-3

A long roll of biaxially-oriented poly(ethylene terephthalate) film base having a width of 15 cm and a thickness of 35 micrometers was transported at 7.6 m/min. through apparatus similar to that shown in FIG. 2 and equipped with an ESI "Electrocurtain" electron-beam apparatus having a width of 30.5 cm. Dry nitrogen containing about 20 parts per million oxygen was forced into the chamber at a rate of 0.6 m³/min. The apparatus was operated at an accelerating voltage of 250 keV to provide absorbed dosage levels of 3, 5 and 10 Mrad. Film base so treated, together with a non-irradiated control (0 Mrad), were each coated on one side with a release silicone which was compounded and applied as follows:

To 100 grams of a vinyl-terminated linear polydimethylsiloxane having a viscosity of 350 cps at 25° C. (see, e.g., U.S. Pat. No. 4,386,135) was added 0.07 g of a neutralized chloroplatinic acid catalyst containing 15 wt-% platinum (see, e.g., U.S. Pat. No. 3,715,334), yielding 100 parts platinum per million parts by weight of polydimethylsiloxane. The catalyzed siloxane was stirred 5 minutes. To it was added 0.25 g of 2-ethylhexyl hydrogen maleate polymerization inhibitor, and the mixture was stirred 15 minutes. Next there was added 2.5 g of a linear polymethylhydrosiloxane crosslinker, available as DC-1107 from Dow Corning Corporation. The resultant blend was stirred 15 minutes, and then coated onto the film base with a 3-roll differential-speed offset-gravure coater, the coating being applied to the side of the film base which faced the electron source during the irradiation step. Curing for 60 seconds at 150° C. in a circulating air oven produced a silicone release liner from which a pressure-sensitive adhesive layer can be cleanly peeled.

Anchorage to the polyester film base of the silicone coating of each silicone release liner was rated by rubbing vigorously with the thumb. Silicone coatings which could not be removed by such abrasion were given an arbitrary rating of "5"; those which were readily removed were rated "1". Intermediate ratings were assigned to coatings having intermediate levels of resistance to removal. Testing was repeated after storing the silicone release liner in air at ordinary room temperatures for the times indicated in Table A.

TABLE A

| Example | Dosage (Mrad) | Initial | 1 week | 2 weeks | 8 weeks | 14 weeks | 6 months |
|---|---|---|---|---|---|---|---|
| | | | Rating after storage for | | | | |
| 1 | 3 | 5 | 4 | 4 | 4 | 4 | 4 |
| 2 | 5 | 5 | 4 | 4 | 4 | 4 | 4 |
| 3 | 10 | 5 | 4 | 4 | 3 | 4 | 4 |
| Control | 0 | 5 | 2 | 1 | 1 | 1 | 1 |

A silicone release liner rated below "3" is judged to have insufficient abrasion resistance for practical reuse. It is believed that prior to the present invention, there was no adhesion-promoting treatment for a polyester film base to provide a solvent-free addition cure silicone release liner that would rate 3 or higher after being stored for several weeks in air at ordinary room temperature.

EXAMPLES 4-9

The process of Examples 1-3 was repeated except that part of the polyester film base, after being irradiated, was stored in air at ordinary room temperatures before being coated. The silicon coatings were evaluated by rubbing with the thumb as in Examples 1-3, with results noted in Table B.

TABLE B

| Example | Dosage (Mrad) | Coating Delay* | Initial | 5 days | 10 days | 17 days |
|---|---|---|---|---|---|---|
| 4 | 3 | 20 sec. | 3-4 | 3-4 | 4 | 3 |
| 5 | 3 | 6 days | 4 | 3-4 | 3-4 | 3-4 |
| 6 | 3 | 1 month | 4 | 4 | 4 | 4 |
| 7 | 5 | 20 sec. | 3-4 | 3 | 3 | 3 |
| 8 | 5 | 6 days | 4 | 4 | 4 | 4 |
| 9 | 5 | 1 month | 5 | 4 | 4 | 4 |
| Control | 0 | 20 sec. | 3-4 | 1 | 1 | 1 |
| Control | 0 | 6 days | 4 | 1 | 1 | 1 |
| Control | 0 | 1 month | 4 | 2 | 1 | 1 |

EXAMPLE 10

The process of Examples 1 and 2 was repeated at an absorbed dosage level of 5 Mrad, except that after curing the silicone coating, an identical silicone coating was applied to the other face of the polyester film base and then cured in the same way, thus producing a double-faced silicone release liner. The coating on each face was rubbed vigorously with the thumb and its resistance to such abrasion was rated from "1" to "5" as in Examples 1-3, both immediately after testing and after storing the silicone release liner at ordinary room temperatures for 18 days. Results are reported in Table C.

TABLE C

| Side of film base | Initial | After 18 days |
|---|---|---|
| that faced beam | 4-5 | 4 |
| away from beam | 4-5 | 4 |
| control | 5 | 1-2 |

We claim:

1. In the manufacture of a release liner comprising a flexible polyester film base and a thin silicone coating, a method for promoting the adhesion to the polyester film base of the silicone coating, which method comprises the steps of (1) continuously passing uncoated polyester film base through an inert atmosphere containing less than 500 ppm oxygen while (2) exposing the film base to irradiation of an electron beam to subject the film base to an absorbed dosage of at least 2 Mrad, and (3) applying a thin silicone coating to a face of the film base to which adhesion of the coating has been enhanced by virtue of steps (1) and (2).

2. Method as defined in claim 1 wherein the silicone is a solvent-free addition-cure silicone.

3. Method as defined in claim 1 wherein the dosage does not exceed 20 Mrad.

4. Method as defined in claim 3 wherein the dosage is from 5 to 10 Mrad.

5. Method as defined in claim 1 wherein the inert atmosphere is substantially nitrogen.

6. Method as defined in claim 1 wherein the inert atmosphere contains less than 40 ppm oxygen.

7. Method as defined in claim 6 wherein the polyester film base is at approximately atmospheric pressure during steps (1) and (2).

8. Method as defined in claim 1 wherein the polyester film base is continuously irradiated in step (2) at a web speed of at least 50 meters per minute.

9. Method as defined in claim 1 wherein the polyester is polyethylene terephthalate.

10. Method as defined in claim 7 wherein the film base is unsupported while being irradiated in step (2) and the adhesion of silicone coatings to both faces of the film base is enhanced.

11. Method as defined in claim 1 wherein said silicone coating is applied in step (3) to the surface of the film base which faced the electron-beam radiation in step (2).

12. The method of claim 1 wherein the electron beam has an accelerating voltage of at least 150 kiloelectron volts.

13. The method of claim 1 wherein the film base is biaxially oriented polyester.

UNITED STATES PATENT AND TRADEMARK OFFICE
CERTIFICATE OF CORRECTION

PATENT NO. : 4,533,566

DATED : August 6, 1985

INVENTOR(S) : Jack L. Evans et al.

It is certified that error appears in the above-identified patent and that said Letters Patent is hereby corrected as shown below:

In Column 2, line 17, "be" should be --by--

In Column 2, line 51, "showthat" should be --show that--

In Column 3, line 41, "product" should be --produce--

In Column 6, line 18, the following should be inserted under Table B -- *The three Controls of Table B are identical to each other, but were coated at the same time as Examples 4, 5 and 6, respectively. Differences in test values between the three Controls are believed to be due to experimental error.--

Signed and Sealed this

Fifteenth Day of October 1985

[SEAL]

Attest:

DONALD J. QUIGG

Attesting Officer

Commissioner of Patents and
Trademarks—Designate